United States Patent
Hubby, Jr.

(10) Patent No.: US 7,543,943 B1
(45) Date of Patent: Jun. 9, 2009

(54) COLOR PERMUTING LIGHT PROJECTOR

(75) Inventor: Laurence Meade Hubby, Jr., Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 11/261,323

(22) Filed: Oct. 28, 2005

(51) Int. Cl.
*G03B 21/14* (2006.01)
*G03B 21/28* (2006.01)
*G02B 27/14* (2006.01)
*H04N 9/12* (2006.01)
*H04N 5/74* (2006.01)

(52) U.S. Cl. ............................ 353/84; 353/37; 359/634; 348/743; 348/771

(58) Field of Classification Search .................... 353/84, 353/30–33, 37, 38, 81, 98, 99, 102; 359/196, 359/197, 204, 205, 209, 210, 216, 226, 227, 359/230, 235, 618, 634, 636, 638–640; 348/739, 348/742, 743, 744, 757–759, 771; 362/257, 362/268, 269, 271, 272, 277, 279, 282–284, 362/307, 317, 321, 324, 326, 330, 332, 333, 362/335; 349/5, 7
See application file for complete search history.

(56) References Cited

U.S. PATENT DOCUMENTS

| 6,464,359 | B1 | 10/2002 | Owen et al. | |
|---|---|---|---|---|
| 6,498,686 | B2 | 12/2002 | Hubby, Jr. | |
| 6,511,182 | B1* | 1/2003 | Agostinelli et al. | 353/7 |
| 2002/0171778 | A1 | 11/2002 | Hubby, Jr. | |
| 2004/0105266 | A1* | 6/2004 | Kim et al. | 362/293 |
| 2006/0098169 | A1* | 5/2006 | Blonde et al. | 353/84 |
| 2006/0170872 | A1* | 8/2006 | Zhang | 353/31 |

* cited by examiner

*Primary Examiner*—Rochelle-Ann J Blackman

(57) ABSTRACT

A light projector includes a light source configured to output a light beam, a display screen configured to display a color image containing pixels, and a color filter positioned between the light source and the projection screen. The light projector also includes a device for sequentially permuting colors of the pixels for a plurality of frames. The device includes at least one of a device for shifting a position of the color filter with respect to the light beam and a device for shifting a path of the light beam that passes through the color filter.

11 Claims, 9 Drawing Sheets

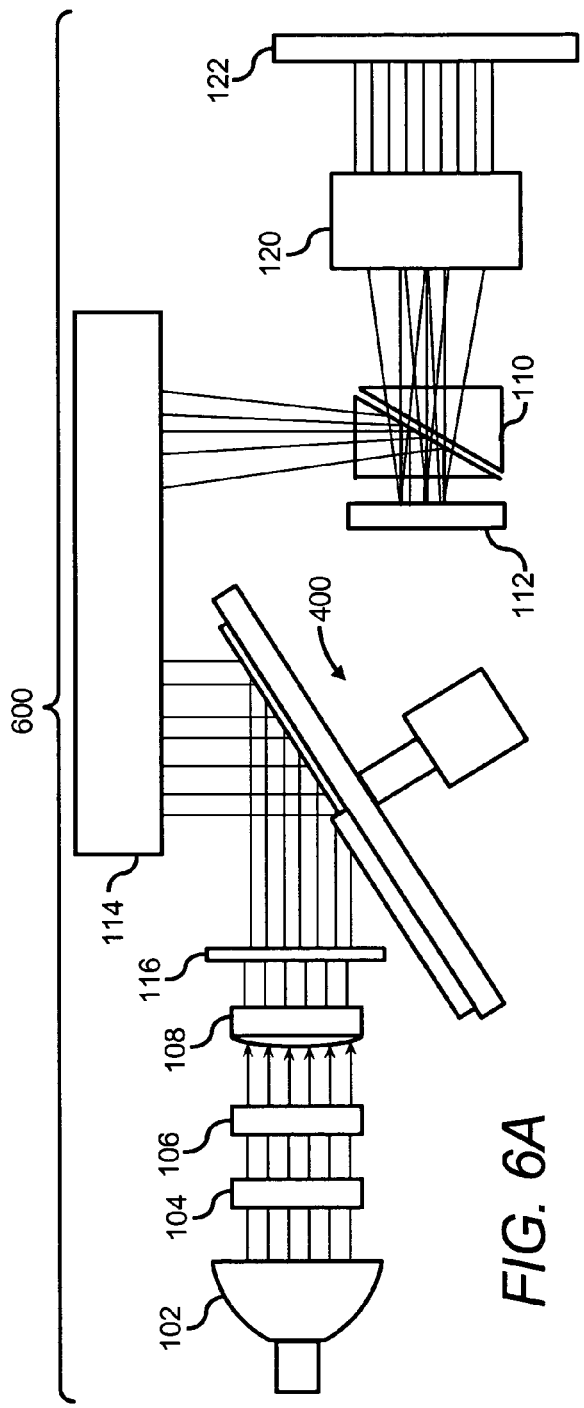
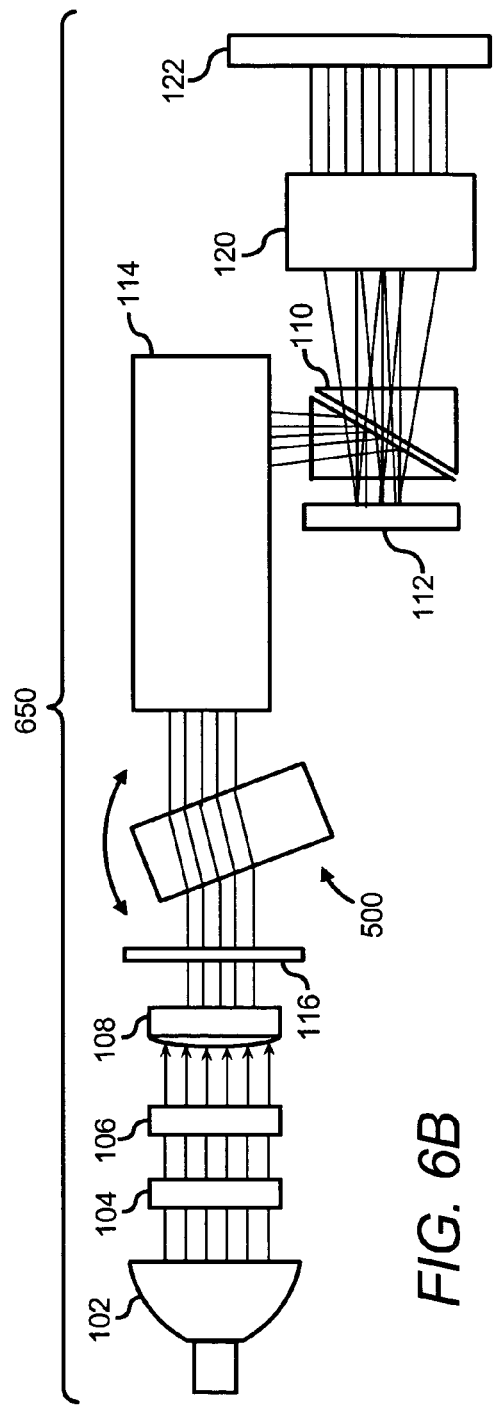
FIG. 6A
FIG. 6B

US 7,543,943 B1

COLOR PERMUTING LIGHT PROJECTOR

BACKGROUND

Audio/Visual (AV) systems are widely used for making presentations and displaying information in commercial settings, and are also increasingly used in the home for television applications. AV systems often may include a projection system that operates according to a sequential color mode, that is, a mode in which monochrome frames of primary color information are displayed rapidly in synchronized succession. Sequential color mode projection systems may include a rotating color wheel interposed between a light source and a Digital Micromirror Device (DMD). By varying the amount of time that light received through the color wheel is reflected to a display screen picture element ("pixel") from each micromirror, the projection system is able to project sequences of full color picture frames onto the display screen.

Many sequential color mode projection systems include one or more fast-responding light valves together with some sort of color selecting means (for example, a color wheel) operating in a sequential color mode. In such systems, the light valve rapidly displays monochrome frames of primary color information (generally three times faster than the normal refresh rate used for non-sequential systems. For instance, to display a frame of a color image, the frame is displayed by projecting three rapid sub-frames, each sub-frame being of a single primary color. That is, to project one frame of a color image, a completely red image sub-frame, a completely green image sub-frame, and a completely blue image sub-frame are projected one after the other, very rapidly.

The rapid display of the monochrome sub-frame information on the light valve is synchronized with the colors passing through the color selecting means. This rapid succession of primary color images creates the impression of a single full color image in the mind of an observer due to the phenomenon of color persistence (that is, the well-known fact that the human eye averages together information received over periods of one-fifteenth of a second or thereabouts).

However, if the observer's eye is not stationary relative to the image during the display on such a device (due to natural rapid saccadic motion of the eye, for example), the relative motion will cause the successive primary color images to fail to overlap perfectly on the viewer's retina. In this case, the viewer will perceive incorrectly colored edges to bright objects, which will disappear when the relative motion ceases. This creates the impression of unpredictable brief flashes of color in situations where none was expected, a situation frequently referred to as "sequential color visual artifacts" or "rainbowing." The phenomenon is worst for two or more small white objects spaced apart horizontally and displayed against a black background. The natural saccades of a viewer's eyes, which are most rapid in the horizontal direction, may be sufficient to cause strong and nearly continuous artifacts under such circumstances.

Efforts to minimize sequential color artifacts have included speeding up the sub-frame display frequency as much as by a factor of 10; however, such speeds are difficult to achieve in commercial systems due to processing bandwidth limitations of projection system components. For example, DMD devices typically have a response time of around 10 microseconds. Furthermore, DMD devices require processing bandwidth for functions other than sequential color artifact suppression such as, for example, image grayscaling. Therefore, existing projection systems have limited processing bandwidth available for suppression of sequential color artifacts without impacting other operational design goals. Many projection systems run at up to three times the required sub-frame display rate, and some systems run at five times the rate. However, even at these increased frequencies, color artifacts are still visible to the human eye. To eliminate sequential color visual artifacts may require a sub-frame display frequency of twenty times the normal rate, which is difficult to achieve in a commercially practical system.

Thus, there is a need for a method and an apparatus to reduce or eliminate sequential color artifacts in a projection system.

SUMMARY

A light projector is disclosed herein. The light projector includes a light source configured to output a light beam, a display screen configured to display a color image containing pixels, and a color filter positioned between the light source and the projection screen. The light projector also includes a device for sequentially permuting colors of the pixels for a plurality of frames. The device includes at least one of a device for shifting a position of the color filter with respect to the light beam and a device for shifting a path of the light beam that passes through the color filter.

BRIEF DESCRIPTION OF THE DRAWINGS

Features of the present invention will become apparent to those skilled in the art from the following description with reference to the figures, in which:

FIGS. 6A and 6B are system block diagrams of light projection systems that respectively include the devices depicted in FIGS. 4A, 4B, and 5, according to embodiments of the invention;

DETAILED DESCRIPTION

For simplicity and illustrative purposes, the present invention is described by referring mainly to an embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Light projection systems and methods are disclosed herein to substantially reduce or eliminate sequential color artifacts. More particularly, a color filter for providing permuted color patterns through which color light beams are passed is disclosed. The permuted color patterns of the disclosed color filter may be selected to reduce sequential color artifacts observable to the human eye by spatially intermixing the color components (for instance, red, green, blue, cyan, magenta, yellow, etc.). In addition, the positions of light beams displayed on a display may be varied through either shifting of the color filter with respect to the light beams or by shifting the light beams that pass through the color filter.

Figure 1A:
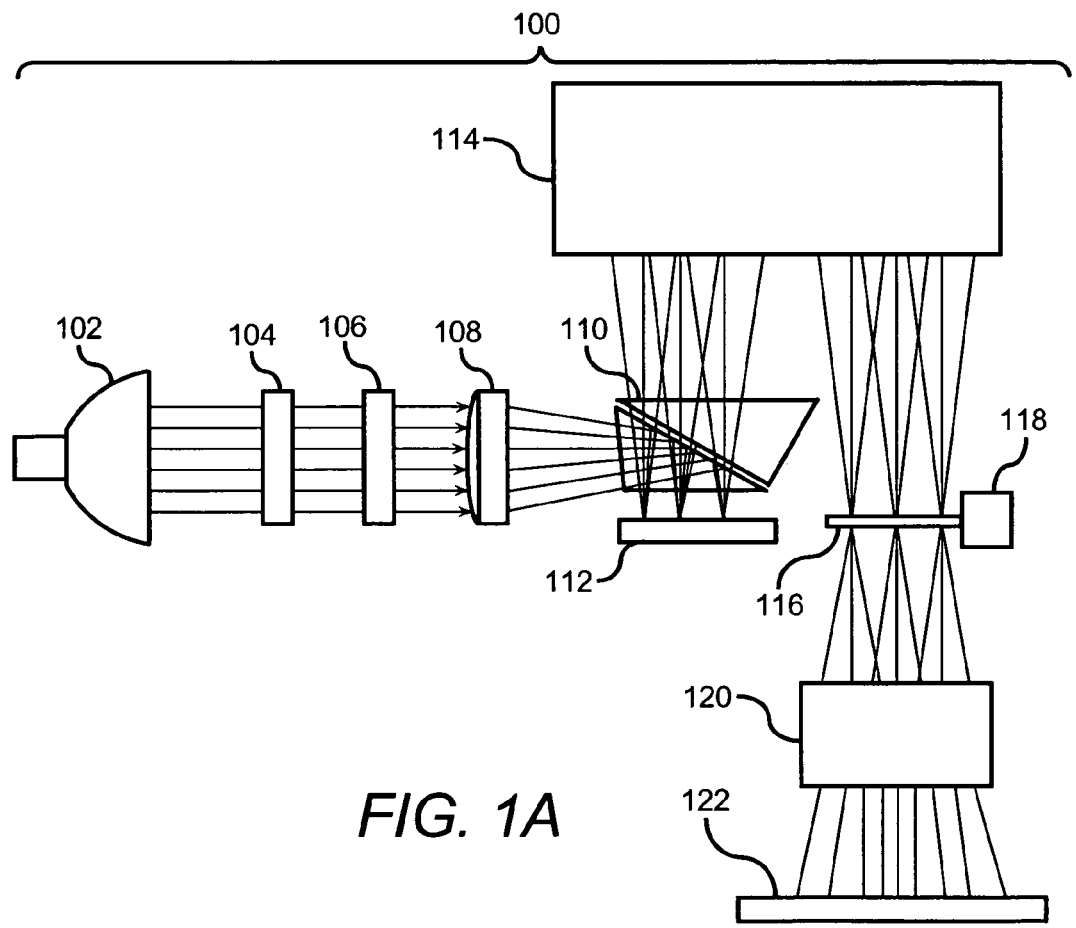
FIG. 1A is a system block diagram of a light projection system according to an embodiment of the invention.

With reference first to FIG. 1A, there is shown a projection system 100. As shown, the projection system 100 may include a light source 102, an Ultraviolet/Infrared (UV/IR) filter 104, an integrator 106, a condenser lens 108, a total internal reflection (TIR) prism 110, a light valve 112, relay optics 114, a color filter 116, a filter translator 118, and a projection lens system 120. The light source 102 may have a full spectrum output, and may thus include an arc lamp, as shown, or any other equivalent illuminator. For example, the light source 102 may comprise a plurality of light emitting diodes, or an appropriate combination of laser beam generators.

The output beam of the light source 102 may pass in a first direction through the UV/IR filter 104 to limit the spectrum of light output from the light source 102. The output beam from the UV/IR filter 104 may then be passed in a first direction to the integrator 106. The integrator 106 may disperse the output beam of the light source 102 so that it is substantially the same in intensity across the entire width of the output beam. The integrator 106 may be of conventional design, such as that manufactured by the Epson Corporation of Japan, and which is used in the Epson PowerLite™ 5000 or 7000 Series Multi-Media Projectors, for example.

The output of the integrator 106 may be focused in the same first direction by a condenser lens 108. The focused light wave output from the condenser lens 108 may be passed in a first direction to the TIR prism 110 and directed thereby onto the light valve 112. The light valve 112 may then pass spatially modulated light beams in a second direction to the relay optics 114 and on to the color filter 116. The filter translator 118 may be coupled to the color filter 116 to cause mechanical translational movement of the color filter 116 in a substantially perpendicular direction with respect to the optical axis of the light beams impinging upon the color filter 116. As described in further detail herein below, this translational movement of the color filter 116 may change the color pattern on the color filter 116 through which the incident light beams pass to thereby reduce sequential color artifacts observable to the human eye. The output beams from the color filter 116 may then pass to a projection lens system 120 and the output therefrom may be passed on to an output display screen 122.

The TIR prism 110 may serve to separate incoming light from the light source 102 to the light valve 112 from spatially modulated light outgoing from the light valve 112 to the relay optics 114. The TIR prism 110 may achieve light separation through providing different angles of propagation for the incoming and outgoing light beams, as disclosed in greater detail herein below with respect to FIG. 1B. Although the TIR prism 110 has been depicted as coming before the color filter 116 in the light path from the light source 102 to a display screen, the order of these components may be reversed without departing from a scope of the system 100.

The light valve 112 may include any reasonably suitable type of micro-mirror construction such as those that operate by means of electrostatic forces, or upon forces generated by energized piezoelectric material. The construction and operation of such micro-mirror light valves are well known to those of ordinary skill in the art, and need not be described in great detail herein. For example, one type of micro-mirror light valve is taught in U.S. Pat. Nos. 4,615,595 and 5,061,049, which describe electrostatically deflected micro-mirrors in a spatial light modulator. A second type of spatial light valve or modulator showing micro-mirrors suspended by torsion hinges and deflected by electrostatic forces is disclosed in U.S. Pat. No. 5,835,256. Yet another type of light valve employing reflective surfaces deformable by excited piezo-electric crystals is shown in U.S. Pat. No. 5,126,836. Irrespective of the particular mechanism for moving, deflecting, or reorienting its micro-mirrors, each light valve or light modulator works in generally the same manner. Each of the movable micro-mirrors is capable of selectively reflecting, and thereby modulating, incident illumination. Each micro-mirror has a first state, or orientation, and a second state or orientation.

Figure 1B:
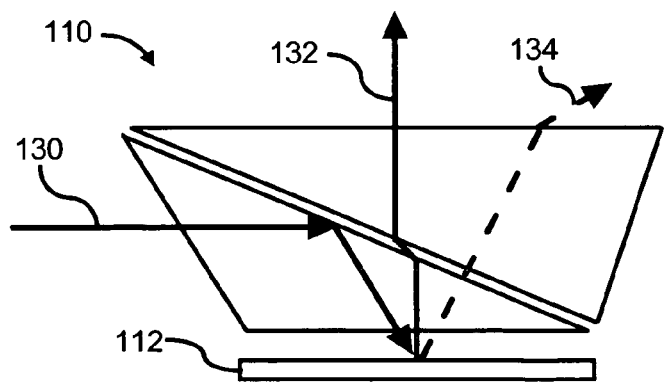
FIG. 1B is a functional block diagram of a Total Internal Reflection (TIR) prism.

Typically, the difference in angular orientation of the micro-mirror between the first and second states is in the range of 10 to 20 degrees. With reference to FIG. 1B, in the first state, usually referred to as the "ON" state, the actuated micro-mirror (not shown) reflects incoming light beams 130 in a second direction toward the relay optics 114, as depicted by the arrow 132. In the second state of the micro-mirror, termed the "OFF" state, selected input light beams 130 are reflected from one or more sub-pixels of the light valve 112 in a third direction toward a light absorber, as indicated by the arrow 134, so that these light beams 134 will not impinge upon the projection screen. With the beam or beams so deflected, the corresponding sub-pixel area on the projection screen remains dark until such time as the respective sub-pixel is again actuated. The combination of the illuminated and the dark sub-pixel areas on the projection screen produces a composite video image.

The light valve 112 may comprise a digital micromirror device (DMD) type of micro-mirror. A DMD is a microchip containing an array of between 800,000 to over 1 million independently controlled movable micromirror surfaces. A DMD may be constructed using three physical layers with intervening air gaps. Each micromirror may be controlled through the state of electronic or other signals to the DMD to either an "on" state or an "off" state. As discussed above, these two states may correspond to different physical orientations of the micromirror. One position may cause light impinging on the micromirror to be reflected to a display screen (that is, the "on" state). Another position may cause light impinging on the micromirror to be directed away from the display to a light absorber (that is, the "off" state). An example of a digital micromirror device is the Digital Light Processing™ (DLP™) semiconductor device available from Texas Instruments of Dallas, Tex.

The relay optics 114 may include conventional telecentric components. By way of example, the relay optics 114 may comprise a modified Dyson reflective relay system as described in U.S. Pat. No. 4,425,037. However, other types of telecentric components may be implemented in the relay optics 114. For example, the relay optics 114 may be include an Offner reflective relay system, an unmodified Dyson reflective relay system, or another reflective, refractive, or diffractive system, or a combination of these systems.

Figure 2A:
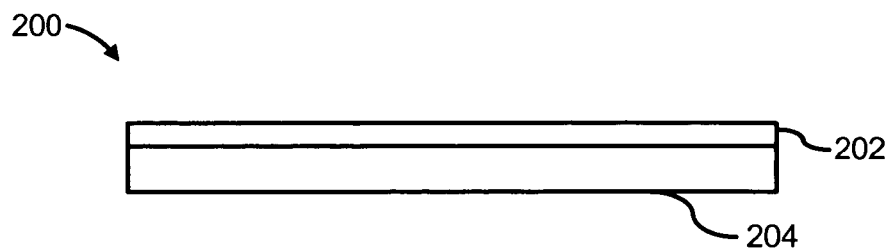
FIG. 2A is a physical block diagram of a mosaic color filter, according to an embodiment of the invention.

The color filter 116 may comprise a mosaic color filter 200, as depicted, for instance, in FIG. 2A. As shown, the mosaic color filter 200 may comprise, for example, a mosaic color tile having mosaic filter coatings 202 applied on a glass substrate 204. The patterns contained in the mosaic color filter 200 may be formed by depositing the corresponding pattern of red, green, and blue transmission color filters 202 on the substrate 204 to form the desired pattern. An example of such a multi-layer dielectric interference filter product is the multi-layer interference filter available from UNAXIS, Inc., of Colorado Springs, Colo.

The color filter 116 may be constructed to provide spatial intermixing of color components to reduce sequential color artifacts otherwise observable to the human eye when viewing the color image on the display screen. Such artifacts may be visible to the human eye due to eye movement which may occur, for example, from natural saccadic motion of the eye as discussed earlier herein. In particular, for instance, the color filter 116 may be constructed to display 1/n of each of "n" color component images during each frame with each of the colors intermixed, instead of displaying all of each color at once. By way of example, the color filter 116 may be constructed to display one-third of each color component (that is, red, green, blue, cyan, magenta, yellow, etc.) images during each frame with each of the colors intermixed.

Spatially intermixed color patterns for various examples of the color filter 116 illustrated using a mosaic color filter 200 to achieve spatial color intermixing are shown in FIGS. 2B-2F. It should, however, be understood that mosaic color filters 200 comprising other configurations may be employed to achieve the spatial color intermixing disclosed herein without departing from a scope of the color filter 116 disclosed herein. In the FIGS. 2B-2F, a portion of the mosaic color filer 200 is shown as needed to describe the spatially intermixed color pattern of the mosaic color filter 200. The remainder of the mosaic color filter 200 may repeat the pattern as shown as required to provide complete filtration of the color light impinging upon the mosaic color filter 200.

Figure 2B:
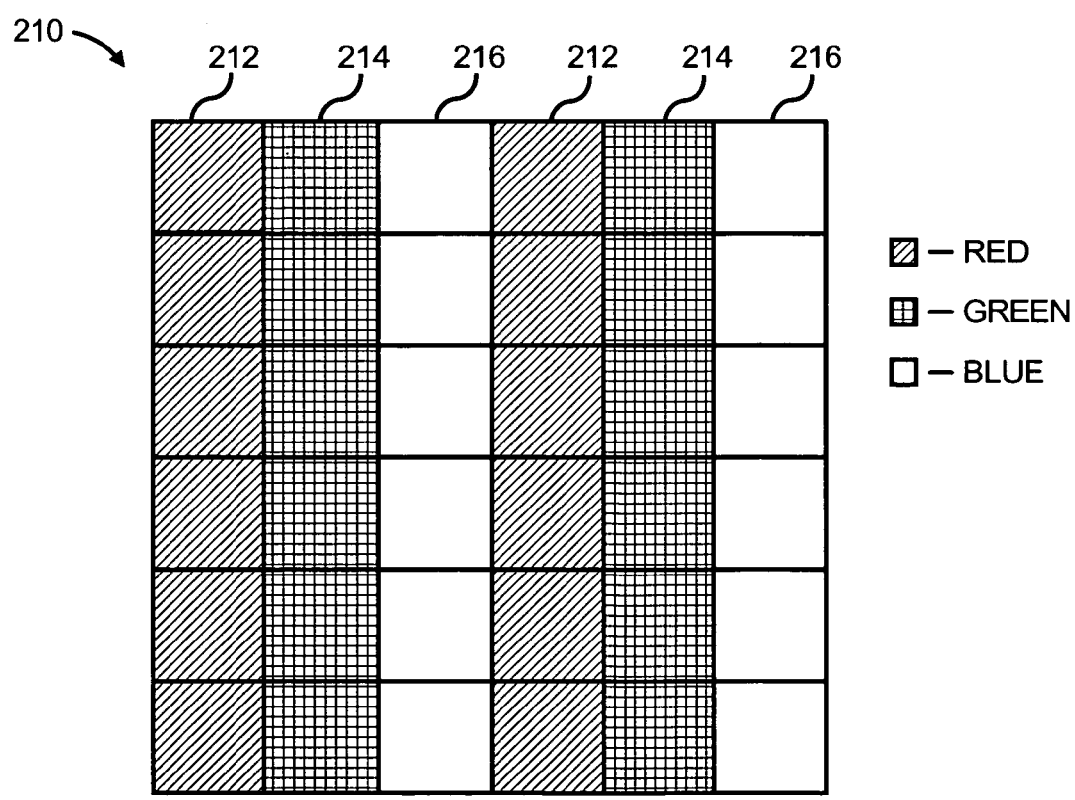
FIG. 2B is a spatial intermixing color pattern for a color filter that intermixes color components in the horizontal direction only (that is, column permuted mixing), according to an embodiment of the invention.

Referring first to FIG. 2B, the mosaic color filter 200 in this example contains a pattern 210 that provides intermixing of color components in the horizontal direction only, or column permuted mixing, such that the spatially intermixed color pattern 210 does not change from pixel row to pixel row. In other words, the pattern 210 includes lines of constant color in the vertical direction. More particularly, for instance, the pattern 210 may comprise a column-only permuted mixing filter and may include a spatially intermixed color pattern having red color columns 212, green color columns 214, and blue color columns 216. Further, this spatially intermixed color pattern 210 may be arranged in horizontally contiguous repeating sets of patterns to provide a first set, a second set, a third set, and so on.

The color filter 116 may be constructed to display one-third of each color component (that is, for instance, red, green, blue, cyan, magenta, yellow, etc.) images during each frame with each of the colors intermixed. For example, referring to FIG. 2B, during the first frame and along each row of pixels in the displayed image, the $1^{st}$, $4^{th}$, $7^{th}$, $10^{th}$, etc., pixels will be from the red image, while the $2^{nd}$, $5^{th}$, $8^{th}$, $11^{th}$, etc., pixels will be from the green image, and the $3^{rd}$, $6^{th}$, $9^{th}$, $12^{th}$, etc., pixels will be from the blue image. For successive frames, the order of the displayed colors for the color filter 116 may be permuted. For example, during the second frame, the $1^{st}$ pixel and every successive third pixel along any horizontal row is green, the $2^{nd}$ pixel and every successive third pixel is blue, and the $3^{rd}$ pixel and every successive third pixel is red. During the third frame, the order of colors along the row is blue, red, and green. Thus, for a system having three color components, after the display of three successive frames, the entirety of all three color component images may be displayed.

Figure 2C:
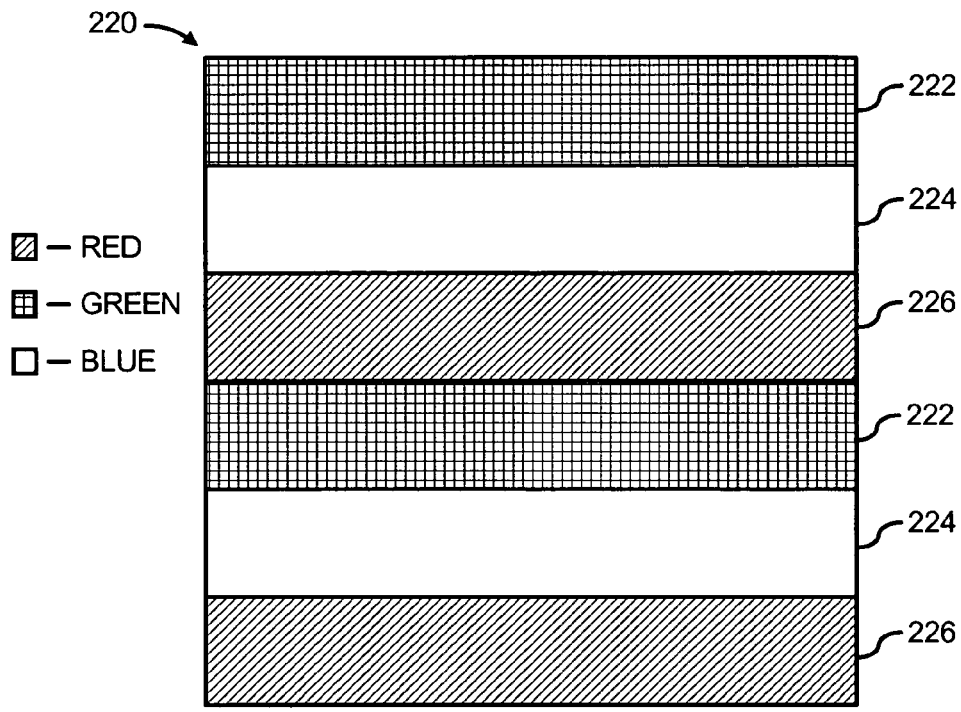
FIG. 2C is a spatial intermixing color pattern for a color filter that intermixes the color components in the vertical direction only (that is, row permuted mixing), according to an embodiment of the invention.

With reference now to FIG. 2C, the mosaic color filter 200 in this example contains a pattern 220 that provides intermixing of color components in the vertical direction only (that is, row permuted mixing) such that the spatially intermixed color pattern does not change from pixel column to pixel column. In other words, the pattern 220 includes lines of constant color in the horizontal direction. More particularly, for instance, the pattern 220 may comprise a row-only permuted mixing filter and may include a spatially intermixed color pattern having green color rows 222, blue color rows 224, and red color rows 226. Further, this spatially intermixed color pattern 220 may be arranged in vertically contiguous repeating sets of patterns to provide a first set, a second set, a third set, and so on.

Figure 2D:
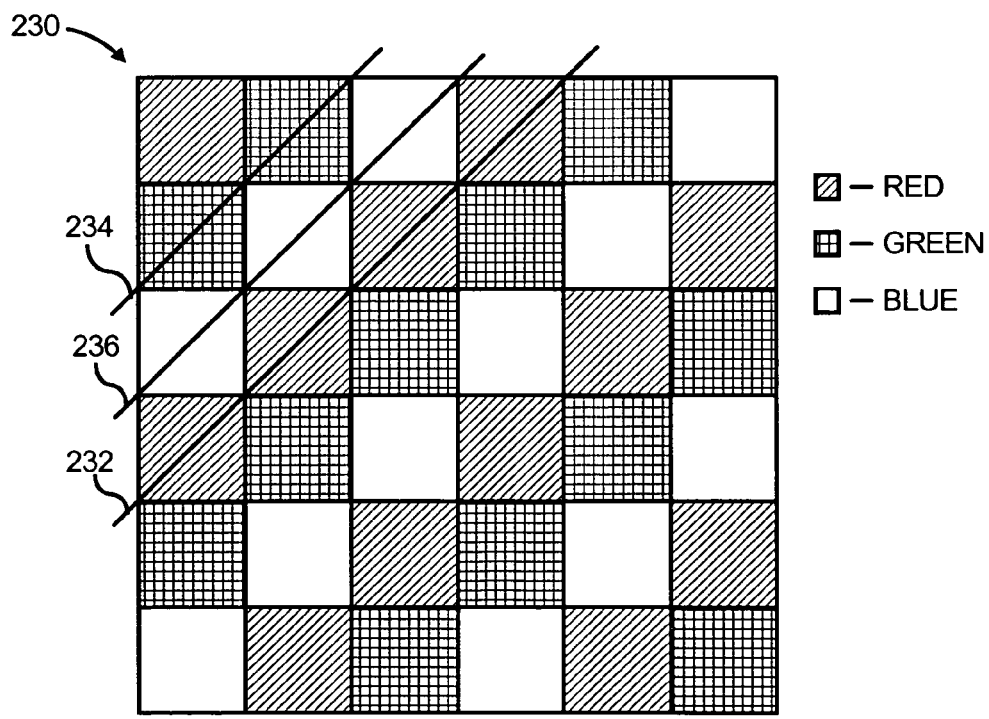
FIG. 2D is a spatial intermixing color pattern for a color filter that intermixes the color components in the horizontal and vertical (that is, row and column permuted mixing), according to an embodiment of the invention.

FIGS. 2B and 2C illustrate examples of mosaic color patterns 210 and 220 in which spatially intermixed color patterns remain the same for pixels in columns and rows, respectively. However, spatially intermixed color patterns may also permute the colors from one row to the next in the image during the display of any given frame. FIG. 2D shows an example of a mosaic color pattern 230 in which the color filter 116 may provide intermixing of color components in the horizontal and vertical (that is, row and column permuted mixing) such that the spatially intermixed color pattern changes from pixel column to pixel column and from pixel row to pixel row by an offset of one. In other words, the pattern 230 includes lines of constant color in diagonal directions. As shown in FIG. 2D, a row and column permuted mixing pattern 230 may include a spatially intermixed color pattern having red color diagonal rows (represented by the pixels on which the line 232 lies), green color diagonal rows (represented by the pixels on which the line 234 lies), and blue color diagonal rows (represented by the pixels on which the line 236 lies).

Other variations in spatially intermixed color patterns are also possible within the scope of the mosaic color filter 200. For example, the mosaic color filter 200 may include an additional fixed offset in the pixel locations for each row (with respect to FIG. 2D), or the mosaic color filter 200 may display entire rows of one color component while changing the color in a cyclical pattern from row to row, or the mosaic color filter 200 may display any other set of fixed patterns of spatially mixed color which displays the entirety of all three color component images after the completion of some fixed number of frames. For example, FIGS. 2E and 2F show various examples of the mosaic color filter 200 having the different color patterns.

Figure 2E:
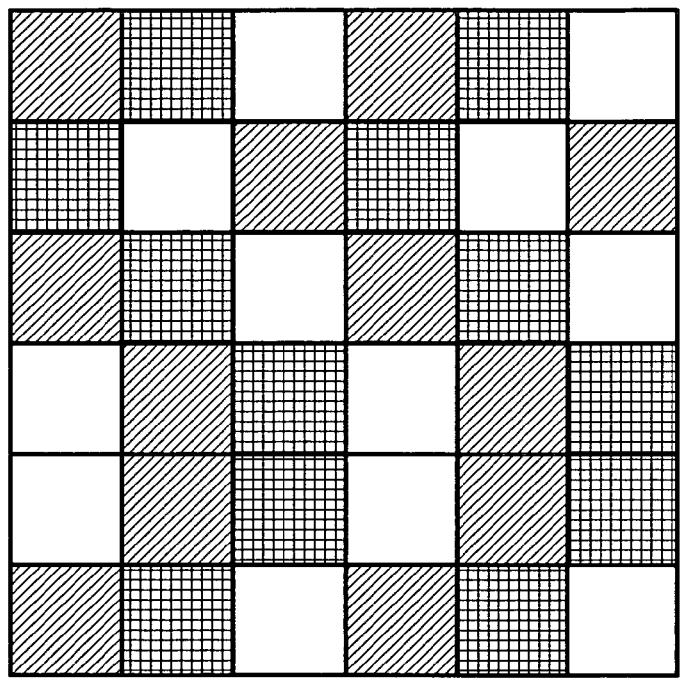
FIG. 2E is a spatial intermixing color pattern for a color filter that intermixes the color components in the horizontal and vertical (that is, row and column permuted mixing) and in which the row start order is chosen randomly, according to an embodiment of the invention.
Figure 2F:
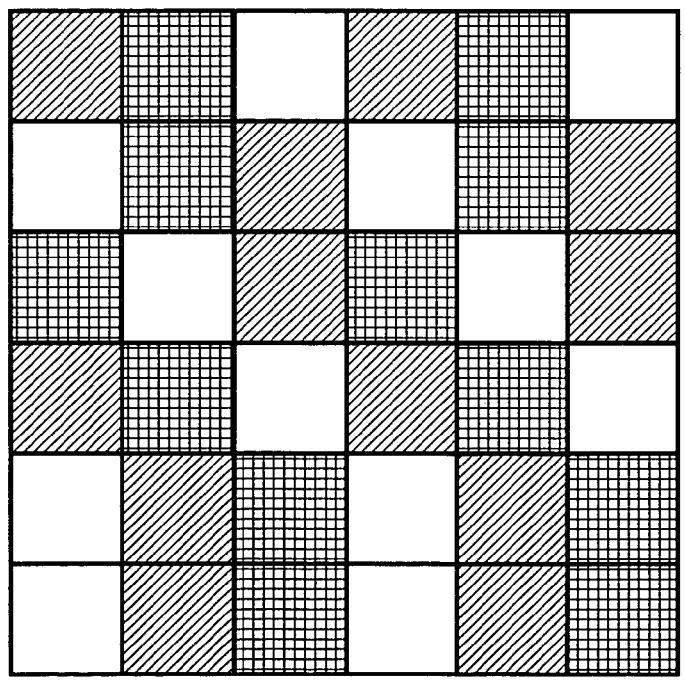
FIG. 2F is a spatial intermixing color pattern for a color filter that intermixes the color components in the horizontal and vertical (that is, row and column permuted mixing) and in which both the row start order and the color order are chosen randomly, according to an embodiment of the invention.

As shown in FIG. 2E, a pattern 240 is depicted which includes an intermixing of color components in the horizontal and vertical directions (that is, row and column permuted mixing) and in which the row start order is chosen randomly. In FIG. 2F, a pattern 250 is depicted which includes an intermixing of color components in the horizontal and vertical directions in which both the row start order and the color order are chosen randomly.

It may be apparent from FIGS. 2B-2F that the spatial color intermixing patterns 210-250 have the property that translational movement of the color filter 116 in the direction of mixing by one pixel spacing produces that next color intermixing pattern in the sequence. Therefore, a complete refresh of the display requires that "n" successive fields or frames be projected, where "n" is the number of color components used. As described herein, the number of color components is three. Alternatively, however, spatial color intermixing may be provided for other numbers of color components such as, for example, two, four, or five colors, without departing from a scope of the color filter 116 disclosed herein.

The color filter 116 may be moved in the direction of desired spatial mixing by one pixel pitch for each successive field or frame. In a first example, the position of the color filter 116 is moved by the filter translator 118. The filter translator 118 is coupled to the color filter 116 to controllably cause translational movement of the color filter 116 in the direction of mixing. In certain instances, the filter translator 118 may effect translational movement of the color filter 116 by one pixel pitch per each successive field or frame. In addition, the filter translator 118 may be a device for causing mechanical movement of the color filter 116 in a translational direction perpendicular with respect to the optical axis of the light beams impinging upon the color filter 116.

Various types of mechanisms may be used in performing the functions of the disclosed filter translator 118. For example, the filter translator 118 may be a voice-coil type actuator, a geneva drive-like rotating device coupled to amplitude reducing levers or pantographs, a piezoelectric translator based on either a stack of piezo elements or a bending bimorph structure, etc. In any regard, the selected filter translator 118 may be capable of providing translational movement of the color filter 116 over the required translational distance in less than one millisecond. As such, use of the color filter 116 may provide a relatively faster response time than the color wheel approach used in other systems.

Figure 3A:
FIGS. 3A-3C illustrate various views of a PZT bimorph filter translator suitable for use as a filter translator, according to an embodiment of the invention.
Figure 3B:
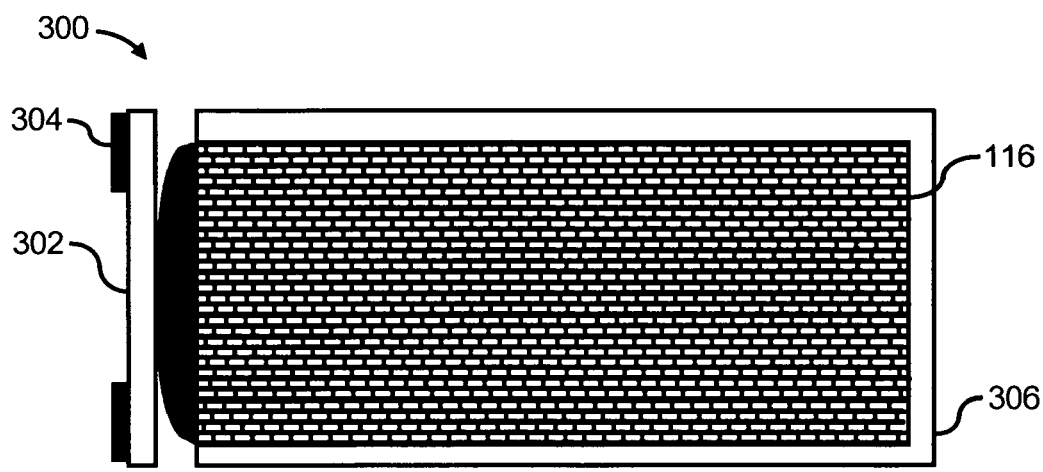
Figure 3C:
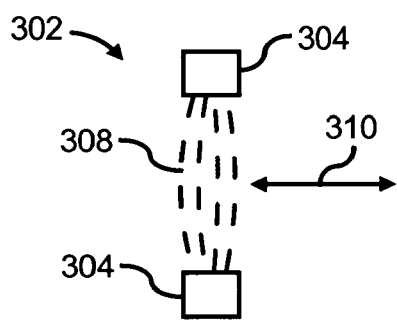

FIGS. 3A-3C illustrate various views of a piezoelectric (PZT) bimorph filter translator 300 suitable for use as the filter translator 118, according to an example. With particular reference first to FIG. 3A, there is shown a side elevational view of the PZT bimorph filter translator 300. As depicted, the PZT bimorph filter translator 300 includes a PZT bimorph element 302, mechanical ground points 304, and a mounting frame 306. The mounting frame 306 may include flexures (not shown) that allow movement of the color filter 116 in response to changes in voltage polarity applied to opposite layers of the PZT bimorph element 302.

Referring now to FIG. 3B, there is shown a front view of the PZT bimorph filter translator 300. As shown, the color filter 116 may be disposed as shown within the mounting frame 306 of the PZT bimorph filter translator 300. FIG. 3C is a diagram illustrating the translational movement effected by the PZT bimorph filter translator 300. As shown, the PZT bimorph element 302 may include two or more layers of piezo material 308 bonded together in an orientation such that one layer expands and the other contracts (as shown by the arrow 310) upon the application of a voltage of one polarity, while the opposite effect occurs upon the application of a voltage having the opposite polarity. An example of such PZT bimorph device is the PL-122 device available from Pi Ceramics of Tustin, Calif., which is capable of producing 1.1 Newtons of force at zero displacement upon the application of +/−30 VDC with one end of the device constrained, thereby effecting a movement distance of 250 microns. A color filter 116 measuring one inch diagonally and 0.7 millimeters in thickness and made substantially of glass may have a mass of approximately 0.5 milligrams. If the color filter 116 and the mounting frame 306 weigh 1.0 milligram, then the predicted movement of the color filter 116 is approximately 27.6 microns in $0.522 \times 10^{-3}$ seconds. As such, the movements of the PZT bimorph device 302 may be sufficient to translate the color filter 116 sufficient distances in the directions indicated by the arrow 310.

The PZT bimorph filter translator 300 may additionally include a position sensor (not shown) to provide relatively precise motion and to compensate for drift over time. Thus, the PZT bimorph filter translator 300 may be inherently quasi-linear in response using the position sensor, because information from the position sensor may only be used to correct the position of the position of the color filter 116. The PZT bimorph filter translator 300 may thus not be required to provide servo loop stability as is the case for voice-coil type systems.

In a yet another alternative example, the filter translator 118 may comprise an electro-optical translation device, such as, for example, the LCD based device described in U.S. Pat. No. 5,715,029. It should, however, be noted that if that LCD based device is employed, the light flux will be reduced by at least half because of the need to polarize the beams.

In addition or alternatively to the filter translator 118, the position of the pixels impinged in the spatial color intermixing patterns 210-250 may be varied by shifting the light beams with respect to the patterns 210-250. In this regard, the shifting of the light beams may produce the next color intermixing pattern in the sequence of patterns contained in the patterns 210-250. As such, the color light beams may be permuted as they are passed through the mosaic filter 116 to substantially reduce or eliminate sequential color artifacts.

Figure 4A:
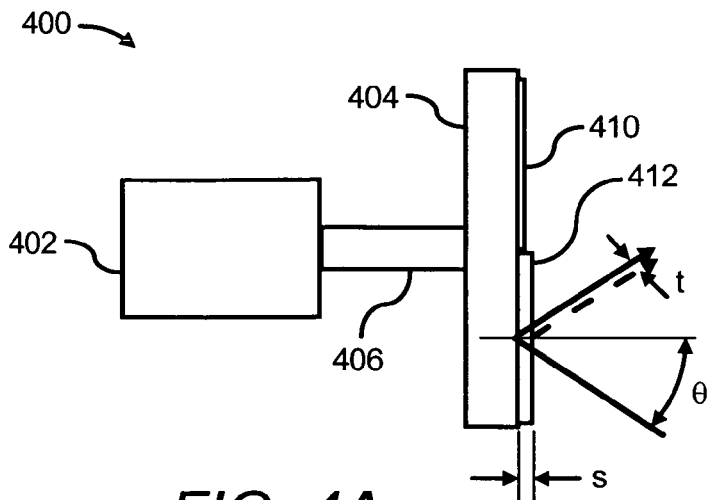
FIGS. 4A and 4B, are a side view and an end view, respectively, of a rotating stepped reflector suitable for use in varying the position of a light beam passing through a color filter, according to an embodiment of the invention.
Figure 4B:
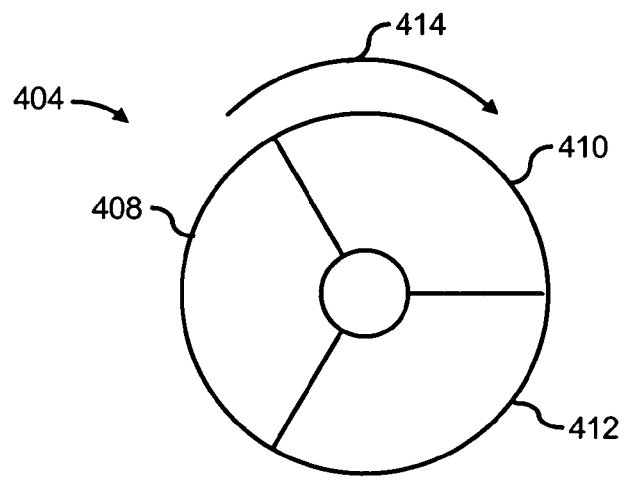

Respective examples of suitable devices 400 and 500 for shifting the position of the light beams are disclosed below in FIGS. 4A, 4B, and 5. With reference first to the device 400 depicted in FIGS. 4A and 4B, there are shown a side view and an end view, respectively, of a rotating stepped reflector 400 that may be used to cause optical movement of the light beams passing through the color filter 116. As shown in FIG. 6A below, the rotating stepped reflector 400 may be positioned between the color filter 116 and the light valve 112 to thereby vary the positions at which the light beams are supplied into the light valve 112.

Referring back to FIGS. 4A and 4B, the rotating stepped reflector 400 may include a motor 402 coupled to a stepped reflector plate 404 by a shaft 406. The stepped reflector plate 404 includes multiple regions 408-412 of varying height, as shown in greater detail in FIG. 4B. In operation, the motor 402 may rotate the stepped reflector plate 404 (as shown by the arrow 414) in synchronization with successive frames to be displayed. As the light beams that pass through spatially intermixed color patterns of the color filter 116 impinges upon the different height regions 408-412, the light beams are reflected from the stepped reflector plate 404 at correspondingly different heights, and, as shown in FIG. 4A, consequently are translated sideways by different amounts. The different translations of the reflected light beams illuminate different portions of the light valve 112, thereby providing optical movement of the light beams passing through the color filter 116. The translation, t, produced by reflection is a function of the step height, s, according to the following equation:

Equation (1): $t=s/\cos(\theta)$; or, $s=t\times\cos(\theta)$, where $\theta$ is the angle of the imaging light as shown in FIG. 4A.

Figure 5:
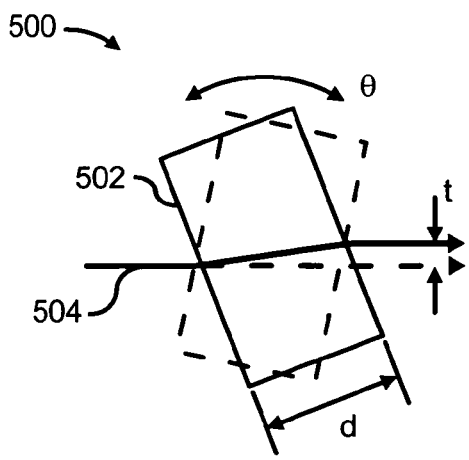
FIG. 5 shows a wobble plate suitable for use in varying the position of a light beam passing through a color filter, according to an embodiment of the invention.

Alternatively, the positions at which the light beams illuminate different portions of the light valve 112 may be varied through use of the wobble device 500 depicted in FIG. 5. The wobble device 500 may also be positioned between the color filter 116 and light valve 112, as shown in FIG. 6B, to thereby vary the positions at which the light beams illuminate the light valve 112. As shown in FIG. 5, the wobble device 500 includes a wobble plate 502 configured to vary the sideways position at which light 504 exits the wobble plate 502 depending upon the rotational position of the wobble plate 502. More particularly, the wobble plate 502 may effect optical translation of the primary light impinging upon the wobble plate 502 by a distance, t, thus illuminating different portions of the light valve 112 by the outgoing light beams, and thereby providing optical movement of the light beams passing through the color filter 116. The distance, t, may be determined according to the following equation:

Equation (2): $t=d\times\sin(\theta)(1-\cos(\theta)/n)$, where d is the thickness, n is refractive index, $\theta$ is the peak rotation angle of the wobble plate 502.

The devices 400 and 500 may be positioned in or may otherwise form part of, for instance, the projection systems 600 and 650, respectively shown in FIGS. 6A and 6B. The projection systems 600 and 650 include all of the elements of the projection system 100 depicted in FIG. 1A, except for the filter translator 118. In addition, some of the elements are in different positions with respect to each other in the projection systems 600 and 650. More particularly, for instance, the output beam passes through the condenser lens 108 and through the color filter 116, then to the device 400 (FIG. 6A) or through the device 500 (FIG. 6B). After the output beam from the color filter 116 reflects off of the device 400 (FIG. 6A) or passes through the device 500 (FIG. 6B), the output beam is directed to the relay optics 114 and onto the TIR prism 110, which directs the output beam onto the light valve 112. The output beam reflects off of the light valve 112, passes through the projection lens system 120 and is displayed on the display screen 122.

In all of the projection systems, 100, 600, and 650, the color filter 116 may be at least "n–1" pixels larger than the active area used on the light valve 112, where "n" is the number of color components. The color filter 116 may have this size because translation of the filtered output beam will move some pixels off of the light valve 112 and there must be other pixels that move onto the light valve 112 on the other side to replace the moved pixels.

As shown in FIGS. 6A and 6B, the devices 400 and 500 generally operate to shift the output beams into "n" number of successive fields or frames, where "n" is the number of color components used. For example, referring again to FIG. 2B, during the first frame and along each row of pixels in the displayed image, either of the devices 400 and 500 may be employed, in the respective projection systems 600 and 650, to cause the light beams that pass through the $1^{st}$, $4^{th}$, $7^{th}$, $10^{th}$, etc., pixels to be from the red image, while the light beams that pass through the $2^{nd}$, $5^{th}$, $8^{th}$, $11^{th}$, etc., pixels will be from the green image, and the light beams that pass through the $3^{rd}$, $6^{th}$, $9^{th}$, $12^{th}$, etc., pixels will be from the blue image.

For successive frames, the order of the displayed colors for the color filter 116 may be permuted. For example, during the second frame, the light beams may be shifted such that the $1^{st}$ pixel and every successive third pixel along any horizontal row is green, the $2^{nd}$ pixel and every successive third pixel is blue, and the $3^{rd}$ pixel and every successive third pixel is red. During the third frame, the light beams may be shifted such that the order of colors along the row is blue, red, and green. Thus, for a system having three color components, after the display of three successive frames, the entirety of all three color component images may be displayed. Although particular reference has been made in the example above to the use of red, green and blue as comprising the color components, it should be understand that the example above may be employed with other color components, such as, magenta, cyan, yellow, etc., without departing from a scope of the invention.

Figure 7A:
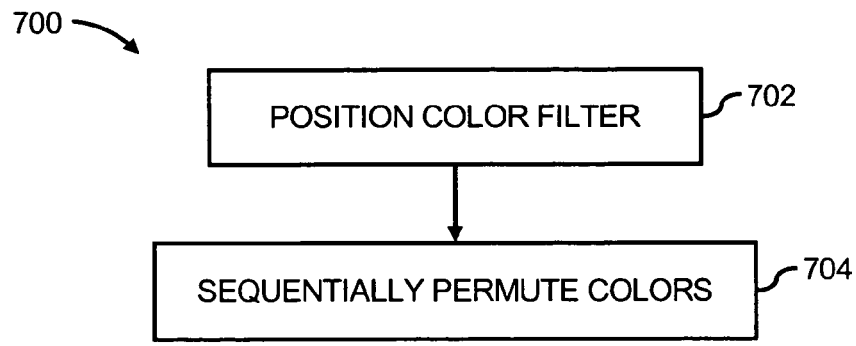
FIGS. 7A and 7B are respective flow charts of sequential color artifact reduction methods for a projection system, according to an embodiment of the invention.
Figure 7B:
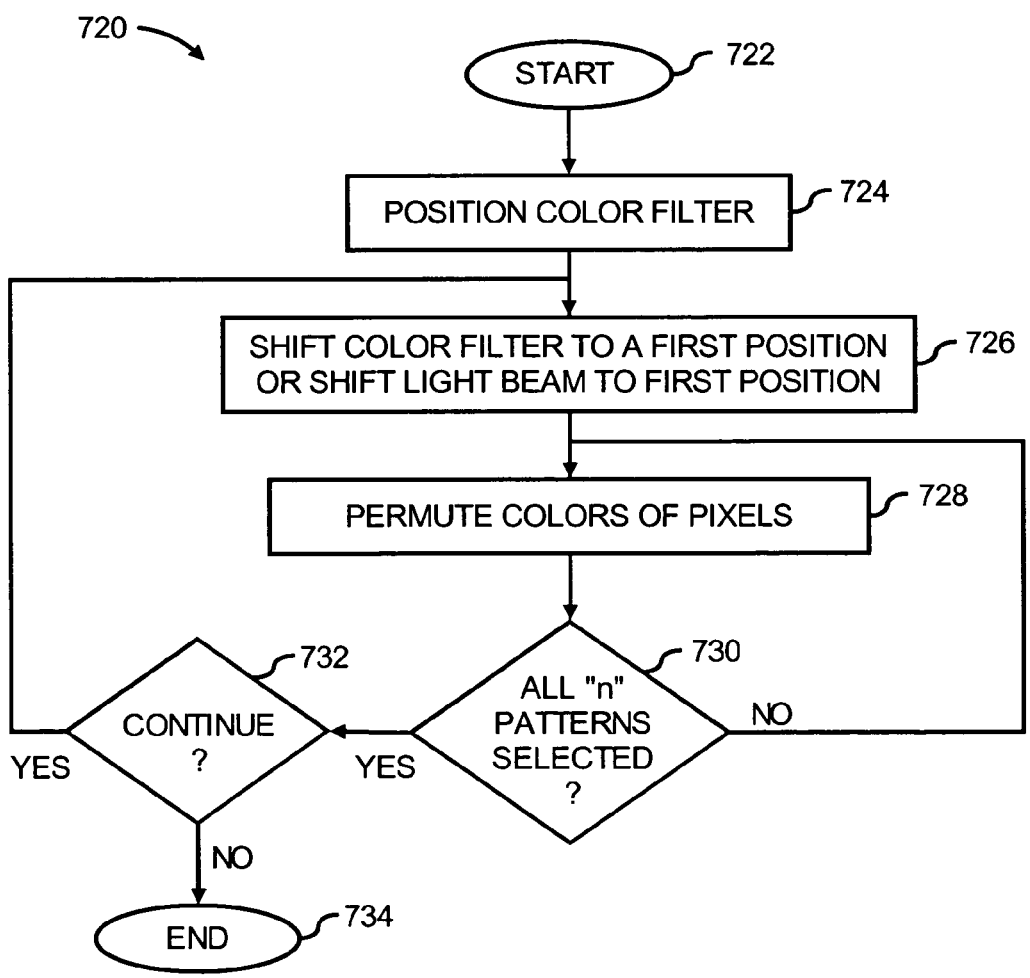

With reference now to FIGS. 7A and 7B, there are shown respective flow diagrams of methods 700 and 720 for permuting colors in a color image having pixels, according to an example. It is to be understood that the following description of the methods 700 and 720 are but a couple of manners of a variety of different manners in which an example of the methods 700 and 720 may be practiced. It should also be apparent to those of ordinary skill in the art that the methods 700 and 720 represent generalized illustrations and that other steps may be added or existing steps may be removed, modified or rearranged without departing from the scopes of the methods 700 and 720.

With reference first to the method 700 depicted in FIG. 7A, at step 702, a color filter 116 having spatially intermixed colors per pixel may be positioned in a light beam path. Step 702 may be considered as being optional because the color filter 116 may have previously been positioned. In any respect, at step 704, the colors of the pixels for a plurality of frames may be sequentially permuted to display the color image. The colors may be sequentially permuted by at least one of shifting the position of the color filter with respect to the light beam path and shifting the position of the light beam path with respect to the color filter. The sequential permutation of the colors of the pixels for the plurality of frames provides for permutations of the colors in the color image. A more detailed description of the steps outlined in the method 700 is provided below with respect to the method 720.

With particular reference now to the method 720 shown in FIG. 7B, at step 722, the method 720 may be initiated. The method 720 may be initiated in response to any of a number of stimuli or conditions. For instance, the method 720 may be initiated in response to receipt of information pertaining to a color image to be displayed.

At step 724, a color filter 116 having spatially intermixed colors per pixel may be positioned in a light beam path. At step 726, the color filter 116 may be shifted to a first position or the light beam may be shifted to a first position, or both. Step 726 may be considered as an optional step because the first positions may comprise starting positions for the color filter 116 and the light beam, respectively, and may therefore not require shifting. In addition, at step 726, and in subsequent steps, if the color filter 116 is to be shifted, the color filter 116 may be coupled to a mechanical device (118) configured to shift the position of the color filter 116 with respect to the light beam. Various examples of suitable mechanical devices capable of shifting the position of the color filter 116 are described hereinabove. In addition, or alternatively, at step 726 and subsequent steps, if the position of the light beam is to be shifted with respect to the color filter 116, a mechanical device for varying the position of the light beam may be employed. Various examples of suitable mechanical devices for varying the position of the light beam are also described hereinabove with respect to FIGS. 4A, 4B, 5, 6A, and 6B.

In addition, at step 726, the light beam may be passed through the color filter 116 such that a first color is displayed at a first pixel location. Step 726 may also be considered as occurring at the first frame. At step 728, the colors of the pixels displayed may be permuted, such that, the pixel locations on the filter 116 are illuminated with a different color than during step 726. More particularly, at a first iteration of step 728, which may be considered as the second frame, the position of the color filter 116 or the position of the light beam may be shifted by one pixel length such that a second color is displayed at the first pixel location.

At step 730, it is determined as to whether an additional color permutation is to be performed. More particularly, an additional color permutation may be performed if the number of colors "n" has not been reached. If "n" has not been reached, a complete cycle of colors has not been displayed in the color image and the image is thus incomplete. In this instance, step 728 may be repeated for another color, such that, the pixels are illuminated with a different color than during step 726 and the first iteration of step 728. More particularly, at a second iteration of step 728, which may be considered as the third frame, the position of the color filter 116 or the position of the light beam may be shifted by one pixel length again such that a third color is displayed at the first pixel location.

Once it is determined that all of the "n" patterns have been selected at step 730, which equates to a display of all of the color components in the required pixel locations, it may be determined as to whether the method 720 is to continue at step 732. If a "no" condition is reached at step 732, the method 720 may end as indicated at step 734. The method 720 may end, for instance following display of all of the frames of an image, manually discontinued, etc. If a "yes" condition is reached at step 732, the method 720 may continue beginning at step 726, where color filter 116 and/or the position of the light beam may be repositioned such that another set of frames may be displayed. In addition, steps 724-732 may be repeated for so long as additional frames are to be displayed.

The operations set forth in the methods 700 and 720 may be contained as a utility, program, or subprogram, in any desired computer accessible medium. In addition, the methods 700 and 720 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 8:
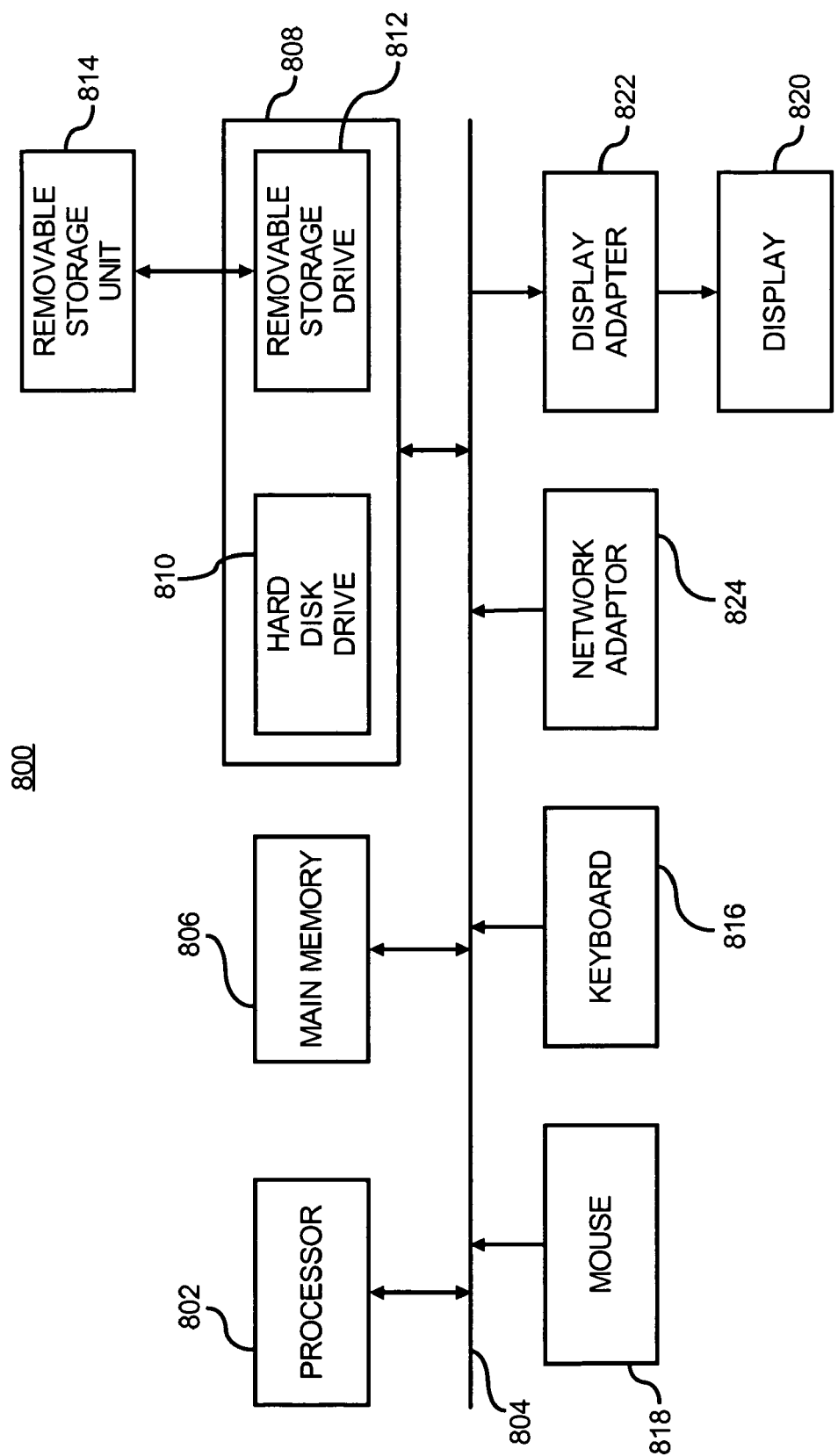
FIG. 8 illustrates a computer system, which may be employed to perform the various methods disclosed herein, according to an embodiment of the invention.

FIG. 8 illustrates a computer system 800, which may be employed to perform the various methods 700 and 720 described above, according to an embodiment. In this respect, the computer system 800 may be used as a platform for executing one or more of the methods 700 and 720.

The computer system 800 includes a processor 802 capable of being used to execute some or all of the steps described in the methods 700 and 720. Commands and data from the processor 802 are communicated over a communication bus 804. The computer system 800 also includes a main memory 806, such as a random access memory (RAM), where the program code for, for instance, the processor 802, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for the sequential color artifact reduction method and system may be stored.

The removable storage drive 810 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor 802 may communicate over a network, for instance, the Internet, LAN, etc., through a network adaptor 824.

It will be apparent to one of ordinary skill in the art that other known electronic components may be added or substituted in the computer system 800. In addition, the computer system 800 may include a system board or blade used in a rack in a data center, a conventional "white box" server or computing device, etc. Also, one or more of the components in FIG. 8 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A light projector comprising:
    a light source configured to output a light beam;
    a display screen configured to display a color image containing pixels;
    a color filter positioned between the light source and the projection screen, said color filter comprising a mosaic of tiles having one of "n" number of colors, wherein "n" is equal to the number of color components used to display the color image on the display screen, and wherein the tiles are arranged in a spatially intermixed color pattern;
    a device for sequentially permuting colors of the pixels for a plurality of frames, said device comprising a mechanical device for shifting the position of the color filter; and
    a light valve positioned between the light source and the color filter, such that, the light beam from the light source impinges upon the light valve prior to passing through the color filter.

2. The light projector according to claim 1, wherein the tiles are arranged along successive rows of the spatially intermixed color pattern such that each row contains tiles having sequentially arranged colors such that "n" number of tiles have different colors.

3. The light projector according to claim 1, wherein the light valve comprises a digital micromirror device.

4. The light projector according to claim 1, wherein the mechanical device comprises a piezoelectric bimorph translator configured to shift the position of the color filter based upon the received level of voltage.

5. The light projector according to claim 1, wherein the device for sequentially permuting colors further comprises a wobble plate configured to vary the sideways position of the path at which the light beam exits the wobble plate, wherein the sideways positions of the light beam depend upon the angle of the wobble plate, and wherein the sideway positions of the light beam are varied for the plurality of frames.

6. A method for permuting colors in a color image having pixels, said method comprising:
    positioning a light valve in a light beam path;
    positioning a color filter having spatially intermixed colors per pixel downstream of the light valve along the light beam path; and
    sequentially permuting colors of the pixels for a plurality of frames to display the color image by shifting the position of the color filter using a mechanical device, wherein the step of shifting the position of the color filter further comprises:
    shifting the color filter to a first position to display a first color at a first pixel location during a first frame;
    shifting the color filter to a second position to display a second color at the first pixel location during a second frame; and
    shifting the color filter to a third position to display a third color at the first pixel location during a third frame.

7. The method according to claim 6, wherein the step of sequentially permuting the colors further comprises sequentially permuting the colors for a number of times equal to the number of colors used to display the color image, wherein the color filter is configured to display each of the number of colors in the pixels following performance of a sequential permutation.

8. The method according to claim 6, wherein the mechanical device comprises a piezoelectric bimorph translator, wherein the step of shifting the position of the color filter comprises varying a voltage supplied to the piezoelectric bimorph translator to shift the position of the color filter.

9. The method according to claim 6, further comprising:
    positioning a wobble plate to vary the sideways position of the path at which the light beam exits the wobble plate; and
    wherein the step of shifting the light beam path comprises varying the sideways position of the wobble plate to vary the sideway positions at which the light beam that passes through the color filter are displayed during the plurality of frames.

10. A system for permuting colors in a color image having pixels, said system comprising:
    means for filtering a light beam supplied from a light valve into a plurality of colors; and
    means for sequentially permuting the colors of the pixels, said means for sequentially permuting comprising a mechanical device for shifting the position of the means for filtering, wherein the means for sequentially permuting the colors of the pixels is configured to:
    shift the means for filtering to a first position to display a first color at a first pixel location during a first frame;
    shift the means for filtering to a second position to display a second color at the first pixel location during a second frame; and
    shift the means for filtering to a third position to display a third color at the first pixel location during a third frame.

11. A computer readable storage medium on which is embedded one or more computer programs, said one or more computer programs implementing a method for permuting colors in a color image having pixels, wherein the color image is displayed through a light valve positioned in a light beam path and a color filter having spatially intermixed colors per pixel positioned downstream of the light valve along the light beam path, said one or more computer programs comprising a set of instructions for:
    shifting the position of the color filter using a mechanical device to sequentially permute colors of the pixels for a plurality of frames to display the color image, wherein the step of shifting the position of the color filter further comprises:
    shifting the color filter to a first position to display a first color at a first pixel location during a first frame;
    shifting the color filter to a second position to display a second color at the first pixel location during a second frame; and
    shifting the color filter to a third position to display a third color at the first pixel location during a third frame.

* * * * *